No. 827,451. PATENTED JULY 31, 1906
H. A. KOHLER.
WHEEL FOR ROLLER SKATES.
APPLICATION FILED JAN. 14, 1905.

Witnesses:
Chas. E. Gorton.
A. Gustafson.

Inventor:
Henry A. Kohler.
By Chas. C. Githman,
Atty.

UNITED STATES PATENT OFFICE.

HENRY A. KOHLER, OF CHICAGO, ILLINOIS.

WHEEL FOR ROLLER-SKATES.

No. 827,451.

Specification of Letters Patent.

Patented July 31, 1906.

Application filed January 14, 1905. Serial No. 241,121.

*To all whom it may concern:*

Be it known that I, HENRY A. KOHLER, a citizen of the United States, residing at Chicago, in the county of Cook and State of Illinois, have invented certain new and useful Improvements in Wheels for Roller-Skates, of which the following is a specification.

This invention relates to improvements in a roller or wheel, and while it has especial relation to that type of wheels employed for roller-skates, yet it is applicable to caster wheels or rollers or those used for sliding doors, small trucks, and for various other purposes; and it consists in certain peculiarities of the construction, novel arrangement, and operation of the parts thereof, as will be hereinafter more fully set forth and specifically claimed.

The principal object of the invention is to provide a strong and durable wheel or roller of the above-named type which shall be simple and inexpensive in construction and so made that its tread portion and the bearings for the axle or journal will be integral with the members comprising the body of the wheel.

In order to enable others skilled in the art to which my invention pertains to make and use the same, I will now proceed to describe it, referring to the accompanying drawings, in which—

Figure 1:
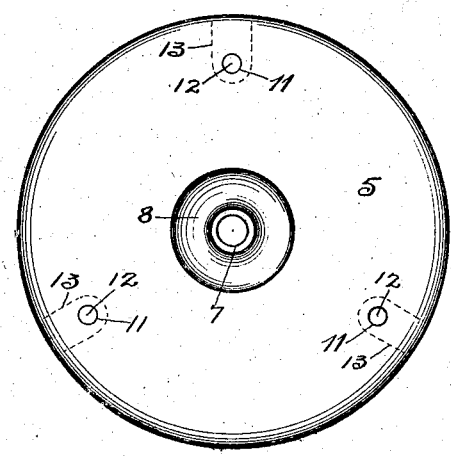
Figure 2:
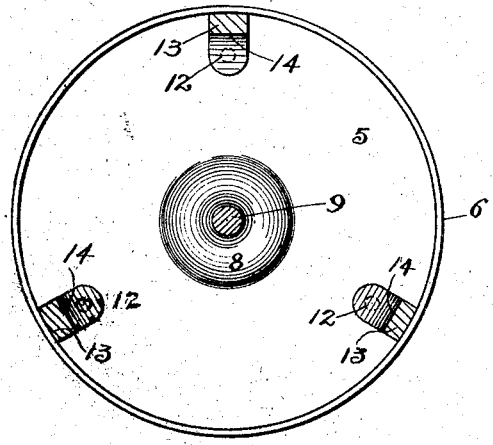

Figure 1 is a face view of a wheel embodying my invention. Fig. 2 is a central sectional view thereof, taken on line 2 2 of Fig. 3 looking in the direction indicated by the arrows; and Fig. 3 is a transverse sectional view through the center of the wheel, showing a portion of the shaft or journal and antifriction-balls mounted on one of the bearings therefor.

Like numerals of reference refer to corresponding parts throughout the different views of the drawings.

The body or main portion of the wheel comprises two circular members 5, which are struck up so as to form at their peripheries inturned flanges 6 and at their central portions with bearings 7 and inwardly-extending cups 8 for the reception and operation of the axle or journal 9 and antifriction-balls 10, respectively. As shown in Fig. 3 of the drawings, each of the flanges 6 extends inwardly from its member 5 at a right angle thereto, and the free edges of said flanges abut against one another and form a close union or joint, thus constituting the tread portion of the wheel. Each of the members 5 is provided near its periphery with a number of openings 11 to receive the reduced ends 12 of the brace-rivets 13, each of which is preferably formed on its inner surface or edge with a curved recess 14, while its outer and side edges are straight and at right angles to one another, so that the side edges will rest against the inner surfaces of the members 5, while the outer edge of each of the rivets will rest against the inner surfaces of the flanges 6, thereby bracing said flanges, as well as the members 5, against inward pressure. The reduced portions or ends 12 of each of the brace-rivets 13 are upset or riveted in the openings 11 of the members 5, thus securing them together immovably in all directions relatively to each other.

Figure 3:
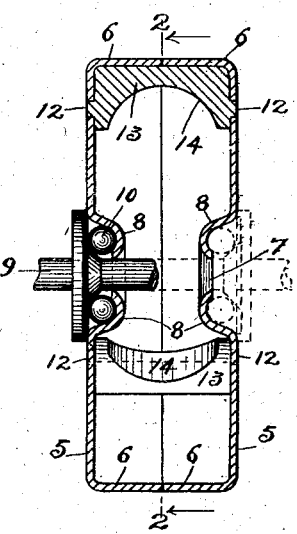

While I have shown the wheel provided with three brace-rivets and prefer to use said number and to employ rivets of the construction shown in Fig. 3 of the drawings and above described, yet it is evident that I may employ any number of such rivets or may use ordinary rivet-bolts for securing the members 5 together without departing from the spirit of my invention.

From the foregoing and by reference to the drawings it will be seen and understood that my improvements are very simple in construction, comprise few parts, are easy and cheap to make and assemble, and are effectual in all respects in the performance of their functions.

Having thus fully described my invention, what I claim as new, and desire to secure by Letters Patent, is—

A wheel comprising two partly-flat circular members each having an inturned right-angled peripheral flange to form the tread portion of the wheel, said members being spaced apart and located in parallelism with one another and having near their peripheries a series of openings, each of said members having on its central portion an inwardly-extending cup integral therewith, and rivet-braces each having its outer and side edges straight to rest against the inner surfaces of the circular members and their peripheral flanges, said brace-rivets also having reduced portions secured in the said openings in said members, substantially as described.

HENRY A. KOHLER.

Witnesses:
CHAS. C. TILLMAN,
A. GUSTAFSON.